3,012,931
NEMATOCIDAL COMPOSITION
Boris Theodore Sokoloff, % Southern Bio-Research Institute, Florida Southern College, Lakeland, Fla.
No Drawing. Filed Mar. 23, 1960, Ser. No. 16,974
8 Claims. (Cl. 167—14)

The present invention relates to compositions which are useful in an aqueous medium as fungicides and bactericides and more especially as nematocides. The present application is a continuation of my application Serial No. 814,155, filed May 19, 1959, and now abandoned.

The burrowing nematode, Radolpholus similis, (Cobb) Thorne, the cause of spreading decline of orange trees, is responsible for great damage to the citrus industry in Florida. Living 6 to 12 feet below the surface, Radolpholus similis burrows into the feeder roots of trees and has heretofore resisted any attempt made to control it by chemical means. The only effective method used heretofore for fighting spreading decline is by destroying the trees in an infested area and by fumigating the soil afterward.

The present invention contemplates novel compositions which can be used in an aqueous medium for controlling the detrimental action of the nematode, Radolpholus similis, as well as that of other nematodes, such as Tylenchulus semipenetrans, Xephinema americanum, Meloidogyne incognita, Panagrellus redivivus, Heterodera tabacum and Pratylenchus penetrans. The compositions also are useful in aqueous medium for controlling the action of fungi, such as Aspergillus niger, Rhizopus nigricans, Candida albicans, Penicillium digitatum, Alternaria citri as well as for treating shoot leaves of citrus trees and seedlings infected with melanose and greasy spot infections and citrus seedlings infested with white flies resulting in sooty mold.

The present invention is based in part upon a first discovery that when certain fish oils are treated with an alkaline hydroxide and the saponification product produced is intimately mixed with from about 2 to 20 percent of an alkali metal borohydride based upon the weight of the saponification product, the resulting compositions are useful in an aqueous medium for controlling the detrimental action of nematodes, fungi and bacteria. Since all fish oils as well as vegetable oils and animal oils are complex mixtures of complex esters of a large number of different fatty acids of various degrees of unsaturation, it was conceived that an intimate mixture of an alkaline hydroxide saponification of any of these oils with an alkali metal borohydride would provide compositions which would be useful in an aqueous medium for controlling the detrimental action of nematodes, fungi and bacteria. Subsequent investigations confirmed this conception. Such compositions have been prepared with a large number of different oils of the above classes and tested and all have been found effective in an aqueous medium for controlling the detrimental action of nematodes, fungi and bacteria, none having been found ineffective.

One method for preparing the composition of the invention comprises dissolving the oil in about an equal volume of acetone. The resulting solution is mixed with about an equal volume of concentrated ammonium hydroxide and heated at a temperature of about 100° C. until the odor of ammonia is removed. About an equal volume of a saturated solution of sodium hydroxide in methanol then is added and the mixture heated to a temperature of about 100° C. until a solid product is obtained comprising a substantially completely saponified oil. A methanol solution of this saponified product is mixed with from about 2 to 20 percent by weight of an alkali metal borohydride based upon the weight of the saponified product. A larger proportion of alkali metal borohydride may be used but is not necessary. The methanol then is evaporated to obtain a dry material which then is pulverized to a powder.

Another method for preparing the composition of the invention comprises mixing about two parts by weight of an animal, vegetable or fish oil with one part by weight of an aqueous solution containing from about 35 to 46 percent of sodium hydroxide by weight and from about 9 to 12 percent of sodium borohydride by weight. This mixture then is boiled until a solid product is obtained which usually requires from 2 to 4 hours. The solid product then is pulverized.

In the preparation of the composition of the invention any alkali metal borohydride may be used, such as sodium borohydride or potassium borohydride. Lithium borohydride may be used but is more expensive.

Any fish, vegetable or animal oil may be used in preparing the composition of the invention. Illustrative oils are shark, redfish, cod liver, dogfish, herring, menhaden, sardine, pilchard, salmon, rape, whale, sperm, babassu, castor coconut, corn, cottonseed, hempseed, kapok, linseed, mustard, olive, palm, peanut, perilla, poppyseed, sesame, soybean, sunflower, teaseed, walnut, tall, beef tallow mutton tallow, lanolin, lard, neat's-foot and mixtures thereof.

The invention is illustrated further by the following examples.

EXAMPLE 1

Menhaden fish oil in the amount of 100 grams was dissolved in 100 ml. of acetone to obtain a solution free of lumps and residue. To this solution 200 ml. of concentrated ammonium hydroxide (58%) was carefully added and mixed. This mixture was heated on a steam bath until there was no odor of ammonia. To this mixture about an equal volume of a saturated methanol solution of sodium hydroxide was added and thoroughly mixed. The methanol then was removed by evaporation and dried at a temperature fo about 100° C. to obtain 180 grams of an alkaline hydroxide saponification product of the fish oil. This product was dissolved in 108 ml. of methanol and 26.1 grams of potassium borohydride was added and thoroughly mixed therewith. After standing at room temperature for about 3 hours the methanol was removed from this mixture by evaporation to obtain a dry material which was pulverized to obtain a powder. The weight of the final product was 195 grams.

EXAMPLE 2

Twenty garden pots were filled with soil to a depth of about eight inches. About 35 nematodes, Radolpholus similis, were implanted deep in the soil of each pot. Four days later, 10 corn seeds were planted in each pot. About 30-32 days after planting the seeds, the corn began to grow and the nematodes attacked the corn roots. Each of ten pots were sprayed with 200 cc. of an aqueous solution containing 0.75 percent by weight of the composition prepared as described in Example 1. After 48 hours the same pots were again sprayed in the same manner. The other ten control pots were treated in the same manner except that plain water was used for spraying. During the next ten days the control and treated pots were observed. The corn plants in the control pots became yellowish in color, grew poorly, and showed signs of nematodic invasion. The corn in the treated pots appeared to be growing normally. Forty five days after the seeds were planted, the number of nematodes in each pot was counted. There was an average of 105 nematodes in each aliquot sample taken from the control pots. Nine of the treated pots were free of nematodes while one showed an average of 4 nematodes per aliquot sample.

EXAMPLE 3

Ten citrus seedlings about one year of age were infested with white flies. As a result of this invasion, sooty mold spots appeared upon the leaves of the seedlings. Each seedling was sprayed three times at intervals of five days with 200 cc. of an aqueous solution containing 0.5 percent of the composition prepared as described in Example 1. At the end of this treatment, all ten seedlings were free of white flies and the sooty mold spots had disappeared.

EXAMPLE 4

The fungi culture, *Candida albicans*, was implanted in a series of tubes containing Sabouraud proteose-peptone dextrose media (4% dextrose, 1% proteose-peptone, 95% distilled water). One tube served as a control and the others contained an aqueous solution containing different concentrations of the composition prepared as described in Example 1. The tubes were permitted to stand for 48 hours at room temperature. The growth, positive and negative, was determined by microscopic and macroscopic examination. *Candida albicans* was completely arrested in the tube containing the above aqueous solution having a concentration of 8 mg. of the composition of the invention per 5 ml. of solution.

The fungi *Aspergillus niger*, *Rhizopus nigricans*, *Penicillium digitatum* and *Alternaria citri* responded in a similar manner to the composition of the invention when tested in a similar manner.

EXAMPLE 5

A composition was prepared as follows. 707 grams of redfish oil and 350 grams of an aqueous solution containing 10 percent of sodium borohydride and 35 percent of sodium hydroxide by weight were mixed in a beaker and heated on a steam bath for 2 hours. The resulting solid product was dried at 100° C. to produce 862 grams of a yellow solid.

EXAMPLE 6

A series of tests were made to determine the effect of the compositions of the invention in inhibiting growth of fungus, *Helminthosporium sativum*, contained within and on the surface of naturally infected barley seed. Barley seed known to be heavily infected with the above fungus was treated with aqueous solutions containing different concentrations of the compositions for a period of fifteen minutes by immersion. At the end of this period the solution was drained off and the seed then plated out on petri dishes containing moistened filter paper. Data recording percent disease control were taken at appropriate intervals after initiation of the tests. The compositions used in these tests were prepared as described in Example 5 using different oils. The results of these tests are shown in Table I in which the compositions used are identified by the names of the oil used in their preparation. Data on germination are an index of safety or phytotoxity of the composition.

*Table I*

| Composition | Conc., p.p.m. | Percent Germination | Percent Disease Control |
| --- | --- | --- | --- |
| Refresh oil | 10,000 | 84 | 82 |
|  | 1,000 | 92 | 76 |
|  | 100 | 96 | 50 |
| Whale oil | 10,000 | 90 | 82 |
|  | 1,000 | 92 | 62 |
|  | 100 | 94 | 54 |
| Cod liver oil | 10,000 | 90 | 80 |
|  | 1,000 | 92 | 68 |
|  | 100 | 94 | 42 |
| Menhaden fish oil | 10,000 | 90 | 84 |
|  | 1,000 | 70 | 70 |
|  | 100 | 86 | 54 |
| Lanolin | 10,000 | 92 | 64 |
|  | 1,000 | 94 | 60 |
|  | 100 | 94 | 46 |
| Beef tallow | 10,000 | 90 | 68 |
|  | 1,000 | 92 | 54 |
|  | 100 | 94 | 58 |
| Lard | 10,000 | 94 | 58 |
|  | 1,000 | 84 | 62 |
|  | 100 | 84 | 46 |
| Soybean oil | 10,000 | 94 | 82 |
|  | 1,000 | 96 | 70 |
|  | 100 | 98 | 60 |
| Linseed oil | 10,000 | 90 | 72 |
|  | 1,000 | 92 | 70 |
|  | 100 | 86 | 48 |
| Palm oil | 10,000 | 94 | 40 |
|  | 1,000 | 90 | 52 |
|  | 100 | 78 | 42 |
| Olive Oil | 10,000 | 92 | 68 |
|  | 1,000 | 94 | 42 |
|  | 100 | 84 | 38 |
| Castor oil | 10,000 | 82 | 84 |
|  | 1,000 | 88 | 60 |
|  | 100 | 94 | 28 |
| Cottonseed oil | 10,000 | 94 | 82 |
|  | 1,000 | 94 | 62 |
|  | 100 | 96 | 16 |

EXAMPLE 7

Table II shows the results of a series of tests made to determine nematocidal activity of compositions of the invention against a species of Panagrellus, an active saprozoic nematode. In these tests the nematodes were collected from the culture medium in a routine manner to insure their freedom from food contamination and uniformity of age by means of a Baerman funnel technique. The screen was carried out in stoppered test tubes containing 10 ml. of the composition-dosage to be tested and the nematode population at the time of seeding adjusted to 50-75 per tube. The tests were run in duplicate and the check or blank contained nematodes in tap water. The nematodes when properly handled will survive at least seven days in the blanks without the addition of food. Microscopic observations on the behavior of the nematodes were made daily over a period of seven days to establish the rapidity of action of the compositions and the final end point of kill. The constant and active movement of this species permits easy identification of live and dead individuals. The compositions used in these tests were prepared as described in Example 5 using different oils and are identified in Table II by the names of the oils used in their preparation. In the table "Nema" means a standard commercially available nematocide.

Table II

| Composition | Dosage (p.p.m.) | Percent Mortality after (days) | | | | | | |
|---|---|---|---|---|---|---|---|---|
| | | 1 | 2 | 3 | 4 | 5 | 6 | 7 |
| Nema | 10,000 | 95 | 100 | 100 | | | | |
| | 1,000 | 0 | 25 | 45 | | | | |
| | 100 | 0 | 0 | 0 | | | | |
| Redfish oil | 9,000 | 100 | | 100 | 100 | 100 | | 100 |
| | 900 | 100 | | 100 | 100 | 100 | | 100 |
| | 90 | 15 | | 98 | 98 | 99 | | 99 |
| Whale oil | 9,000 | 100 | 100 | | 100 | | 100 | |
| | 900 | 65 | 100 | | 100 | | 100 | |
| | 90 | 0 | 0 | | 0 | | 50 | |
| Cod liver oil | 9,000 | 95 | 100 | | 100 | | 100 | |
| | 900 | 85 | 100 | | 100 | | 100 | |
| | 90 | 25 | 72 | | 80 | | 95 | |
| Menhaden fish oil | 9,000 | 100 | | 100 | | | 100 | |
| | 900 | 100 | | 100 | | | 100 | |
| | 90 | 25 | | 85 | | | 100 | |
| Cottonseed oil | 9,000 | 100 | | 100 | 100 | 100 | | 100 |
| | 900 | 100 | | 100 | 100 | 100 | | 100 |
| | 90 | 0 | | 30 | 35 | 50 | | 87 |
| Linseed oil | 9,000 | 100 | | 100 | | | 100 | |
| | 900 | 99 | | 100 | | | 100 | |
| | 90 | 90 | | 99 | | | 100 | |
| Palm oil | 9,000 | 100 | | 100 | | | 100 | |
| | 900 | 100 | | 100 | | | 100 | |
| | 90 | 98 | | 100 | | | 100 | |
| Olive oil | 9,000 | 100 | | 100 | | | 100 | |
| | 900 | 100 | | 100 | | | 100 | |
| | 90 | 85 | | 100 | | | 100 | |
| Castor oil | 9,000 | 100 | | 100 | | | 100 | |
| | 900 | 85 | | 100 | | | 100 | |
| | 90 | 0 | | 0 | | | 100 | |
| Cottonseed oil | 9,000 | 100 | | 100 | | | 100 | |
| | 900 | 100 | | 100 | | | 100 | |
| | 90 | 90 | | 100 | | | 100 | |
| Lanolin | 9,000 | 100 | | 100 | 100 | 100 | | 100 |
| | 900 | 100 | | 100 | 100 | 100 | | 100 |
| | 90 | 0 | | 20 | 40 | 40 | | 40 |
| Beef tallow | 9,000 | 100 | 100 | | 100 | | 100 | |
| | 900 | 95 | 100 | | 100 | | 100 | |
| | 90 | 0 | 95 | | 95 | | 100 | |
| Lard | 9,000 | 100 | | 100 | | | 100 | |
| | 900 | 99 | | 100 | | | 100 | |
| | 90 | 90 | | 100 | | | 100 | |

I claim:

1. A solid composition consisting of an intimate mixture of the alkaline hydroxide saponification products of an oil and from about 2 to 20 percent by weight of an alkali metal borohydride based upon the weight of the saponification products, said oil being selected from the group consisting of shark, redfish, cod liver, dogfish, herring, menhaden, pilchard, salmon, rape, sardine, whale, sperm, babassu, castor, coconut, corn, cottonseed, hempseed, kapok, linseed, mustard, olive, palm, peanut, perilla, poppyseed, sesame, soybean, sunflower, teaseed, walnut, tall, beef tallow, mutton tallow, lanolin, lard, neat's-foot and mixtures thereof.

2. A solid composition consisting of an intimate mixture of the alkaline hydroxide saponification products of a fish oil and from about 2 to 20 percent by weight of an alkali metal borohydride based upon the weight of the saponification products.

3. A solid composition consisting of an intimate mixture of the alkaline hydroxide saponification products of a vegetable oil and from about 2 to 20 percent by weight of an alkali metal borohydride based upon the weight of the saponification products.

4. A solid composition consisting of an intimate mixture of the alkaline hydroxide saponification products of an animal oil and from about 2 to 20 percent by weight of an alkali metal borohydride based upon the weight of the saponification products.

5. A composition as claimed by claim 1 wherein the alkali metal borohydride is selected from the group consisting of sodium borohydride and potassium borohydride.

6. A composition as claimed by claim 2 wherein the alkali metal borohydride is selected from the group consisting of sodium borohydride and potassium borohydride.

7. A composition as claimed by claim 3 wherein the alkali metal borohydride is selected from the group consisting of sodium borohydride and potassium borohydride.

8. A composition as claimed by claim 4 wherein the alkali metal borohydride is selected from the group consisting of sodium borohydride and potassium borohydride.

References Cited in the file of this patent
UNITED STATES PATENTS
2,925,441    Brown _____ Feb. 16, 1960